(12) United States Patent
Lawrence et al.

(10) Patent No.: US 8,101,072 B2
(45) Date of Patent: *Jan. 24, 2012

(54) PHOSPHOROUS REMOVAL SYSTEM

(75) Inventors: Eric Allen Lawrence, Madrid, IA (US); Joseph E. Zuback, Camarillo, CA (US)

(73) Assignee: Siemens Industry, Inc., Alpharetta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/613,454

(22) Filed: Nov. 5, 2009

(65) Prior Publication Data

US 2010/0051526 A1 Mar. 4, 2010

Related U.S. Application Data

(63) Continuation of application No. 11/428,635, filed on Jul. 5, 2006, now Pat. No. 7,670,486.

(60) Provisional application No. 60/696,846, filed on Jul. 6, 2005.

(51) Int. Cl.
*C02F 1/58* (2006.01)
*C02F 101/10* (2006.01)

(52) U.S. Cl. ............ 210/195.3; 210/199; 210/202; 210/203; 210/265; 210/906

(58) Field of Classification Search ............ 210/906
See application file for complete search history.

(56) References Cited

U.S. PATENT DOCUMENTS

| | | | |
|---|---|---|---|
| 2,122,074 A | 6/1938 | Stevenson | |
| 3,423,309 A | 1/1969 | Albertson | |
| 3,545,619 A | 12/1970 | Ettlich et al. | |
| 3,617,569 A | 11/1971 | Daniels et al. | |
| 3,792,773 A | 2/1974 | Ross | |
| 3,870,633 A | 3/1975 | Setterstrom | |
| 3,975,276 A | 8/1976 | Schmid et al. | |
| 4,008,159 A | 2/1977 | Besik | |
| 4,028,241 A | 6/1977 | Davis et al. | |
| 4,081,365 A | 3/1978 | White et al. | |
| 4,309,291 A * | 1/1982 | Probstein et al. | 210/713 |
| 4,388,195 A | 6/1983 | von Hagel et al. | |
| 4,547,286 A | 10/1985 | Hsiung | |
| 4,724,085 A * | 2/1988 | Pohoreski | 210/713 |
| 5,120,435 A | 6/1992 | Fink | |

(Continued)

FOREIGN PATENT DOCUMENTS

| | | |
|---|---|---|
| EP | 0 423 403 | 4/1991 |
| EP | 1 584 606 | 10/2005 |
| ES | 2 288 366 A1 | 1/2008 |
| WO | WO 01/79117 | 10/2001 |
| WO | WO 2005/097287 | 10/2005 |

OTHER PUBLICATIONS

USFilter Microfloc Trident HS Multi-Barrier Packaged Water Treatment System, published Jun. 2, 2005, 2 pages.

(Continued)

*Primary Examiner* — Peter A Hruskoci

(57) ABSTRACT

A phosphorus removal system is operable to remove phosphorus from an influent. The system includes a first section receiving the influent and discharging a first flow. A first coagulant inlet is positioned upstream of the first section and is in fluid communication with the influent to introduce a first coagulant selected to precipitate phosphorus. A second section receives the first flow and discharges a second flow, and a third section receives the second flow and discharges an effluent. A second coagulant inlet is positioned downstream of the first section and upstream of the third section to introduce a second coagulant selected to precipitate phosphorus.

8 Claims, 2 Drawing Sheets

U.S. PATENT DOCUMENTS

| | | |
|---|---|---|
| 5,167,840 A | 12/1992 | Jaccarino |
| 5,759,401 A | 6/1998 | Boussely et al. |
| 5,766,488 A | 6/1998 | Uban et al. |
| 6,379,549 B1 | 4/2002 | LePoder et al. |
| 6,428,705 B1 | 8/2002 | Allen |
| 6,755,973 B2 | 6/2004 | Allen |
| 7,563,373 B2 | 7/2009 | Bolduc |
| 7,670,486 B2 * | 3/2010 | Lawrence et al. .......... 210/195.3 |
| 2003/0189006 A1 | 10/2003 | Allen |

OTHER PUBLICATIONS

USFilter Microfloc Trident Water Treatment System, published Mar. 1, 2005, 12 pages.

European Search Report dated Aug. 5, 2008.

English language esp@cenet abstract for ES 2 288 366 A1, Jan. 2008.

Summons to attend oral proceedings to Rule 115(1) EPC dated Sep. 7, 2010, issued in corresponding European application, EP 06774508.3.

* cited by examiner

PHOSPHOROUS REMOVAL SYSTEM

RELATED APPLICATION DATA

This is a continuation of application Ser. No. 11/428,635, filed Jul. 5, 2006, now U.S. Pat. No. 7,670,486, which claims priority to U.S. Provisional Application Ser. No. 60/696,846 filed on Jul. 6, 2005, the disclosures of each of which are incorporated herein by reference.

BACKGROUND

The present invention relates to a system and method for removing phosphorus from an influent. More particularly, the invention relates to a system and method for removing phosphorus from an influent using a multi-stage treatment system.

Influent, such as contaminated water, is often treated using a multi-stage process to allow for the removal of various contaminates. The treatment processes may include coagulation, absorption, adsorption, filtration, biological treatment, and/or chemical treatment. However, phosphorus can be difficult to remove because it may be present in different forms such as soluble phosphorus, polyphosphate, and phosphorus tied to bacteria or other organic material. In addition, some particulate phosphorus is too small for filtration or coagulation to be effective.

Present systems generally cannot reduce the level of phosphorus in an influent below about 50 parts per billion (ppb).

SUMMARY

In one embodiment, the invention provides a phosphorus removal system that is operable to remove phosphorus from an influent. The system includes a first section receiving the influent and discharging a first flow. A first coagulant inlet is positioned upstream of the first section and is in fluid communication with the influent to introduce a first coagulant selected to precipitate phosphorus. A second section receives the first flow and discharges a second flow, and a third section receives the second flow and discharges an effluent. A second coagulant inlet is positioned downstream of the first section and upstream of the third section to introduce a second coagulant selected to precipitate phosphorus.

In another embodiment, the invention provides a method of reducing the quantity of phosphorus in a flow that passes through a multi-section treatment process. The method includes selecting a first coagulant that precipitates phosphorus, mixing the first coagulant with the flow to define a first flow, and directing the first flow to a first section. The method also includes drawing a second flow from the first section, introducing the second flow to a second section, and drawing a third flow from the second section. The method further includes introducing the third flow to a third section, discharging an effluent from the third section, selecting a second coagulant that precipitates phosphorus, and introducing the second coagulant into one of the second flow and the third flow.

In another embodiment, the invention provides a method of reducing the quantity of phosphorus in a flow. The method includes selecting a first coagulant that precipitates phosphorus, adding a quantity of the first coagulant to the flow to produce a first flow, and directing the first flow to a first section that is operable to remove a portion of the first coagulant and a portion of the phosphorus in the first flow, and to discharge a second flow. The method also includes directing the second flow to a filter that is operable to filter the second flow and to discharge an effluent, backwashing the filter, and adding a quantity of a second coagulant to the filter during the backwashing step. The method further includes collecting a portion of particles from the filter during the backwash and adding at least a portion of the collected particles to the first flow.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
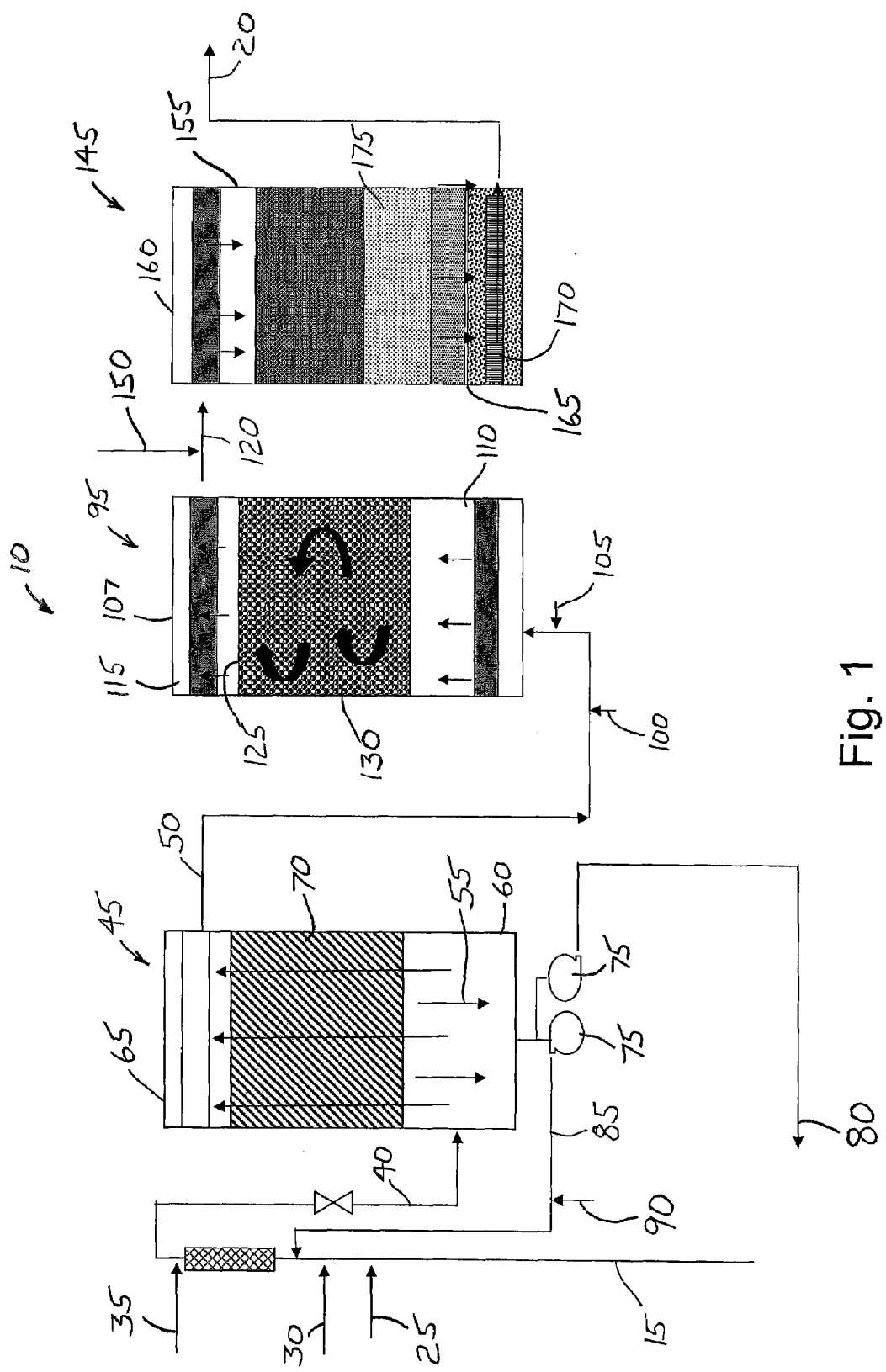
FIG. 1 is a schematic illustration of a multi-stage treatment system during normal operation.

FIG. 1 is a schematic illustration of a multi-stage treatment system 10 that is capable of treating an influent 15 to produce an effluent 20 having desired properties (e.g., desired contaminant levels, turbidity, etc.). Systems similar to the one illustrated are sold by USFILTER as TRIDENT water treatment systems. The illustrated treatment system 10 includes three stages of treatment, with other systems including more or fewer stages. For example, many systems 10 employ a settling stage in which the influent 15 is allowed to settle for a predetermined period of time before it is directed into the three illustrated stages. Other systems may include ozone treatment or still other treatments, in addition to those discussed herein. As such, the invention should not be limited to three-stage systems, nor should the invention be limited to the three particular stages described herein.

Influent 15 enters the illustrated three-stage system 10 via a pipe, conduit, or other flow path. Chemicals 25 can be added to the influent 15 to adjust the pH and the alkalinity of the flow before further treatment. In addition, a first coagulant 30 and a first polymer 35 are added to the influent 15 to define a first flow 40 that then enters the three stage system 10.

The first flow 40 enters a first stage 45 of the multi-stage treatment system 10. In the illustrated construction, the first stage 45 includes a lamella, or tube section that functions to separate the first flow 40 into a second flow 50 and a sludge 55. The tube section 45 includes a bottom portion 60, a top portion 65, and a plurality of substantially vertically oriented tubes 70 that extend between the bottom portion 60 and the top portion 65. The first flow 40 enters the tube section 45 at the bottom portion 60 and the second flow 50 exits the tube section 45 from the top portion 65.

The first polymer 35 acts as a flocculent to collect contaminates within the first flow 40 and form larger heavier particles of contaminates (floc). Similarly, the first coagulant 30 collects contaminates and forms larger, heavier particles. The first coagulant 30 is preferably selected from a number of available metal salts, with aluminum-based salts (e.g., alum, etc.) and iron-based salts (e.g., ferric chloride, ferric sulfate, ferrous sulfate, etc.) being preferred. The metal salts aid in precipitating phosphorus from the first flow 40. Thus, the first coagulant 30 reduces the amount of phosphorus in the first flow 40 as it passes through the tube section 45.

In the tube section 45, the larger, heavier particles do not flow upward through the tubes 70 with the second flow 50, but rather fall downward and collect on the bottom to form the sludge 55. One or more pumps 75 are positioned to draw sludge 55 from the tube section 45 and pump the sludge 55 to waste 80 as required. In some constructions, the pumps 75 operate continuously to draw the sludge 55 from the tube section 45, with other constructions employing intermittent pump operation. In preferred constructions, a portion of the sludge 85 is pumped into the influent 15 or first flow 40, via a first return line, before the first flow 40 enters the tube section 45. This allows any of the first coagulant 30 or first polymer 35 that remains active within the sludge 85 to collect additional contaminates, thus reducing the quantity of first coagulant 30 and first polymer 35 required.

In some constructions, a second coagulant 90 is added to the flow of sludge 85 before it enters the influent 15 or first flow 40. The additional coagulant 90 further improves the reduction of contaminates in the second flow 50. Generally, the same metal salt is employed as the second coagulant 90 as was employed as the first coagulant 30. However, other systems may employ a different coagulant, or multiple coagulants (e.g., alum in combination with ferric chloride) if desired.

The second flow 50 exits the tube section 45 and flows into a second section 95 of the multi-stage treatment system 10. In some constructions, a third coagulant 100 is added to the second flow 50 before it enters the second section 95. In preferred constructions, the third coagulant 100 includes the same metal salt as was used as the first coagulant 30 and/or the second coagulant 90, with other coagulants also being suitable for use. Additional polymer 105 can also be added before the second flow 50 enters the second stage 95 if desired. Like the coagulant 100, preferred constructions employ the same polymer 105 that was used as the first polymer 35. However, other polymers may be employed as desired.

The second section 95 of the illustrated multi-stage treatment system 10 includes an adsorption clarifier 107 having a bottom portion 110 and a top portion 115. The second flow 50 enters the adsorption clarifier 107 near the bottom 110 and flows upward to the top portion 115. A third flow 120 exits the adsorption clarifier 107 from the top portion 115.

In a preferred arrangement of the adsorption clarifier 107, a media retainer 125 such as a screen holds a buoyant adsorption media 130 in place. The second flow 50 flows upward through the adsorption media 130, which adsorbs unwanted contaminates as the flow passes.

Periodically, the adsorption clarifier 107 must be flushed (see FIG. 2) to collect the unwanted contaminates that have been adsorbed by the adsorption media 130. The collected contaminates are directed to waste 80, with a portion of the collected contaminates 135 being directed to the influent 15 or first flow 40 via a second return line. In some constructions, a fourth coagulant 140 is added to the flow 135 within the second return line before the flow 135 enters the influent 15 or the first flow 40. As with the other coagulants, the fourth coagulant 140 is preferably a metal salt, and more preferably, the same metal salt as is used as the first coagulant 30, the second coagulant 90, and/or the third coagulant 100.

The third flow 120 passes out of the adsorption clarifier 107 near the top portion 115 and enters a third section 145 of the multi-stage treatment system 10. In some constructions, a fifth coagulant 150 is added to the third flow 120 before the third flow 120 enters the third section 145. As with prior coagulants, preferred constructions employ the same coagulant for the fifth coagulant 150 as is employed as the first coagulant 30, the second coagulant 90, the third coagulant 100, and/or the fourth coagulant 140, with other coagulants also being possible.

In the illustrated construction, the third section 145 includes a mixed media filter 155 that receives the third flow 120, including the fifth coagulant 150 if added, near a top portion 160 of the filter 155. The mixed media filter 155 includes the top portion 160 and a bottom portion 165 that supports an underdrain structure 170. Mixed media 175 (e.g., gravel, sand, fine heavy density material, and the like) is arranged above the underdrain structure 170 such that the particle size becomes smaller from the top portion 160 to the bottom portion 165. This course-to-fine arrangement contributes to the filter's ability to capture unwanted contaminate particles to produce a high-quality (low contaminant) effluent 20 (e.g., drinking water).

As the third flow 120 passes through the filter media 175, additional contaminates are removed. The flow eventually reaches the underdrain structure 170 which collects the fluid and discharges it from the multi-stage treatment system 10 as the effluent 20.

Figure 2:
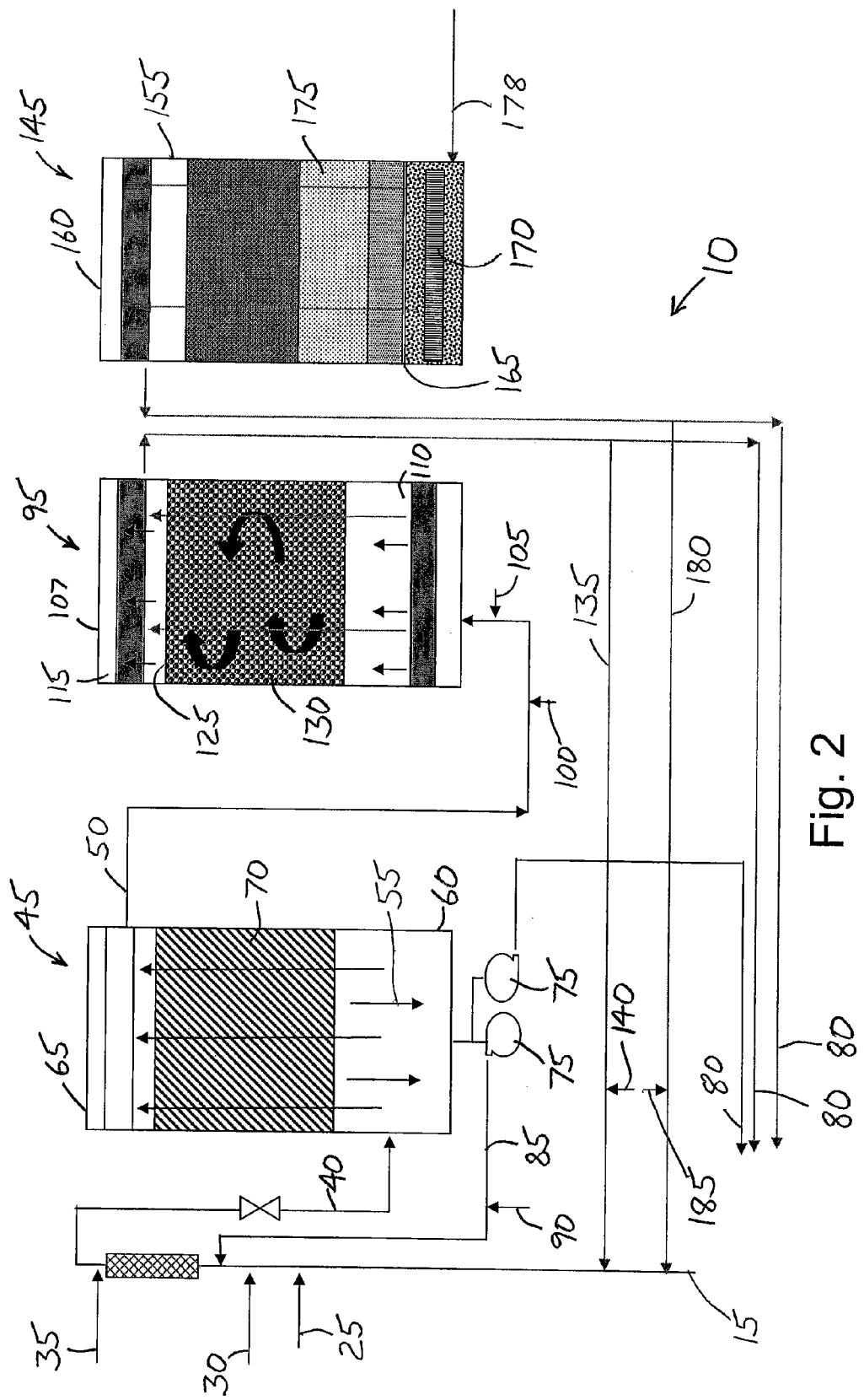
FIG. 2 is a schematic illustration of the multi-stage treatment system of FIG. 1 during a rinse of a second stage and a backwash of a third stage.

Periodically, the mixed media filter 155 is backwashed, as illustrated in FIG. 2, to remove the contaminates captured by the filter media 175. During the backwash, water and/or air 178 are introduced into the underdrain system 170 under pressure such that the water and air flows in reverse (i.e., bottom to top) through the filter media 175. The contaminates and water are drawn from the top of the mixed media filter 155 and are directed to waste 80. A portion of the collected contaminates and water 180 is directed to the influent 15 or the first flow 40 via a third return line. In addition, a sixth coagulant 185 can be added to the flow 180 within the third return line before the flow 180 enters the first flow 40. As with prior coagulants, the sixth coagulant 185 is preferably the same coagulant as the first coagulant 30, the second coagulant 90, the third coagulant 100, the fourth coagulant 140, and/or the fifth coagulant 150, with other coagulants also being possible.

In operation, the multi-stage treatment system 10 receives the flow of influent 15 containing phosphorus. The flow of influent 15 is treated to achieve a desired pH and alkalinity. In addition, a quantity of polymer 25 and coagulant 30 is added to produce a first flow 40. The first flow 40 enters the first section 45 of the multi-stage treatment system 10 where the polymer 25 functions to produce large clumps of contaminates or floc, and the coagulant 30 precipitates a portion of the phosphorus. The precipitate and floc collect to form the sludge 55 which is pumped to waste 80. In one arrangement, a portion of the sludge 55 is pumped to the influent 15 or first flow 40 before the first flow 40 enters the first section 45. In preferred arrangements, one to five percent of the sludge 55 is recirculated with other quantities being possible. As discussed, coagulant 90 may be added to the recirculated flow of sludge 55 if desired, to further reduce the phosphorus content of the fluid in the system 10.

The flow exits the first section 45 as the second flow 50 and passes to the second section 95 of the multi-stage treatment system 10. During the transit between the first section 45 and the second section 95, additional coagulant 100 and polymer 105 may be added, as desired.

The second flow 50 passes through the second section 95 where additional contaminates, including additional phosphorus is removed from the flow 50. The third flow 120 leaves the second section 95 and enters the third section 145 of the multi-stage treatment system 10. During the transit from the second section 95 to the third section 145, additional coagulant 150 may be added to the third flow 120 to further reduce the quantity of phosphorus within the flow 120.

The third flow 120 passes through the third section 145 of the multi-stage treatment system 10 and exits the multi-stage treatment system 10 as the effluent 20.

As illustrated in FIG. 2, the second section 95 is periodically rinsed and the third section 145 is periodically backwashed to remove a significant portion of the contaminates collected by the two sections 95, 145 of the multi-stage treatment system 10. The contaminates are collected from the respective sections 95, 145 and are directed to waste 80. A portion of the contaminates 135, 180 from each of the respective stages can be redirected to the influent 15 or the first flow 40 prior to the first flow's entry into the first section 45. In addition, additional coagulant 140, 185 can be added to one or both of the redirected flow of contaminates 135, 180 as desired.

In a preferred arrangement, additional coagulant is added only between the first stage and second stage (100), or to the sludge 85 being pumped back to the influent 15 of the first flow 40 (90).

In one construction, a control system monitors the level of phosphorus, as well as other contaminate levels, throughout the treatment process to determine where to add additional coagulant and in what quantity that must be added to achieve the desired level of phosphorus in the effluent 20, while using the least amount of coagulant possible. In one arrangement, the multi-stage treatment system 10 reduces the level of phosphorus below about 10 ppb.

Thus, the invention provides, among other things, a new and useful multi-stage treatment system 10. More specifically, the invention provides a multi-stage treatment system 10 that reduces the quantity of phosphorus in the treated fluid.

What is claimed is:

1. A contaminant removal system for treating a contaminated influent, the system comprising:
    a pipe connected to a first treatment section, wherein a first flow comprising the influent enters the first treatment section via the pipe;
    the first treatment section comprising a tube section, the first treatment section receiving the first flow, dividing the first flow into a second flow and a sludge, and discharging the second flow;
    a first coagulant inlet positioned upstream of the first section and in fluid communication with the influent to introduce a first coagulant selected to precipitate phosphorus;
    a second section comprising an adsorption clarifier, the second section receiving the second flow and discharging a third flow;
    a third section comprising a media filter, the third section receiving the third flow and discharging an effluent;
    a second coagulant inlet positioned downstream of the first section and upstream of the third section to introduce a second coagulant selected to precipitate phosphorus;
    a first return line connecting the sludge to the pipe connected to the first treatment section, wherein a portion of the sludge is pumped via the return line to the first flow; and
    at least one additional return line connecting a position downstream of the first section, to a position upstream of, and in fluid communication with, the first section, wherein a portion of contaminates from the position downstream of the first section is pumped via the additional return line to a position upstream of the first section, and wherein a portion of the contaminates is mixed with the influent,
    wherein a third coagulant is introduced into the first return line before the portion of sludge is mixed with the influent.

2. The system of claim 1, wherein the first flow enters the first treatment section below the tube section and the second flow exits the first treatment section above the tube section, and wherein the tube section comprises inclined tubes.

3. The system of claim 1, wherein the first coagulant is at least one metal salt.

4. The system of claim 3, wherein the at least one metal salt is chosen from alum, ferric chloride, and ferric sulfate.

5. The system of claim 1, wherein the second coagulant is at least one metal salt.

6. The system of claim 5, wherein the at least one metal salt is chosen from alum, ferric chloride, and ferric sulfate.

7. The system of claim 1, wherein the system further comprises a first polymer inlet positioned upstream of the first treatment section and in fluid communication with the influent to introduce a first polymer selected to form flocs.

8. The system of claim 1, wherein the contaminated influent comprises phosphorus.

* * * * *